United States Patent [19]

Braschel et al.

[11] Patent Number: 4,921,314
[45] Date of Patent: May 1, 1990

[54] ANTI-LOCKING BRAKE CONTROL SYSTEM

[75] Inventors: Volker Braschel, Heilbronn; Dieter Seitz, Schwieberdingen; Jöchen Schäfer, Ludwigsburg, all of Fed. Rep. of Germany

[73] Assignee: Robert Bosch GmbH, Stuttgart, Fed. Rep. of Germany

[21] Appl. No.: 274,051

[22] PCT Filed: Mar. 25, 1987

[86] PCT No.: PCT/EP87/00168

§ 371 Date: Sep. 26, 1988

§ 102(e) Date: Sep. 26, 1988

[87] PCT Pub. No.: WO87/05869

PCT Pub. Date: Oct. 8, 1987

[30] Foreign Application Priority Data

Mar. 26, 1986 [DE] Fed. Rep. of Germany ....... 3610185

[51] Int. Cl.$^5$ ............................ B60T 8/64; B60T 8/70
[52] U.S. Cl. ...................................... 303/110; 303/61;
303/105; 303/109
[58] Field of Search .................... 303/61, 91, 95, 100,
303/103, 105, 106, 110; 188/181 A; 364/426.02

[56] References Cited

U.S. PATENT DOCUMENTS

| 3,888,550 | 6/1975 | Reinecke et al. | 303/103 |
| 4,054,328 | 10/1977 | Leiber et al. | 303/106 X |
| 4,183,588 | 1/1980 | Snyder | 303/110 |
| 4,225,195 | 9/1980 | Weise et al. | 303/105 X |
| 4,485,445 | 11/1984 | Braschel | 364/426.02 |
| 4,647,115 | 3/1987 | Leiber et al. | 303/106 |
| 4,673,226 | 6/1987 | Every et al. | 303/106 X |

FOREIGN PATENT DOCUMENTS

| 2460904 | 6/1976 | Fed. Rep. of Germany . | |
| 3326959 | 2/1985 | Fed. Rep. of Germany | 303/105 |
| 2016621 | 9/1979 | United Kingdom . | |
| 2135745 | 9/1984 | United Kingdom . | |
| 0002709 | 4/1988 | World Int. Prop. O. | 303/103 |

Primary Examiner—Andres Kashnikow
Assistant Examiner—Timothy Newholm
Attorney, Agent, or Firm—Felfe & Lynch

[57] ABSTRACT

An anti-locking brake control system for a motor vehicle comprises wheel speed sensors for determining the speeds of the individual vehicle wheels, an evaluation circuit which receives the wheels speed signals and generates brake pressure control signals, and a brake pressure control device responsive to the brake pressure control signals for controlling the brake pressure applied to the wheels. The evaluation (processing) circuit includes a brake pressure control unit which operates in such a manner that, after brake pressure decays, the brake pressure is first increased in a timed build-up with reference to the brake pressure build-up in a preceding control cycle, and thereafter the brake pressure is further increased by a sequence of pulses until an instability is again detected. The timed pressure build-up has at least two timed pressure build-up phases which have respective durations such that the duration of each one of the timed build-up phases in a given time pressure build-up is longer than the length of the subsequent timed build-up phase in the control cycle. In addition, the duration of the timed build-up is a function of the preceding pressure decay time, this function being such as to reduce the value of longer decay times relative to shorter decay times.

6 Claims, 4 Drawing Sheets

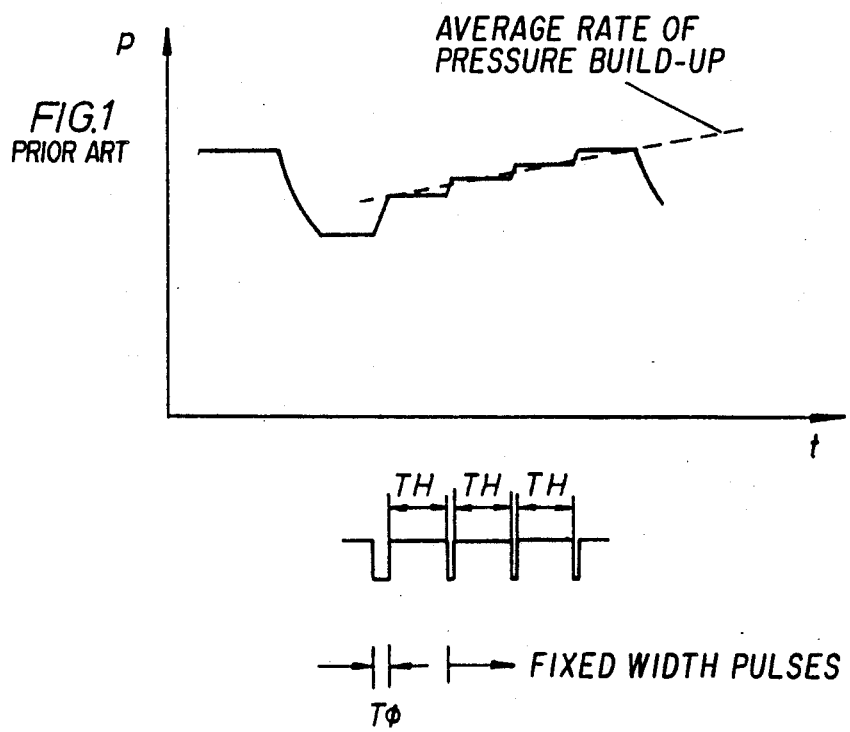
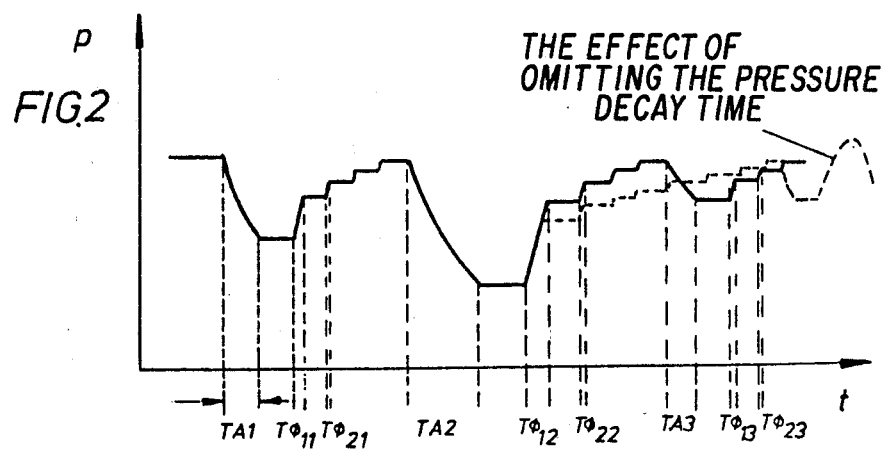

HIGH FRICTION

LOW FRICTION

IMMEDIATE INSTABILITY AFTER $T\phi 1$

BEGINNING OF FRICTION INCREASE

ANTI-LOCKING BRAKE CONTROL SYSTEM

BACKGROUND OF THE INVENTION

The invention relates to an anti-locking brake control system for a motor vehicle. The system is of the type comprising wheel speed sensors for determining the speeds of the individual vehicle wheels, an evaluation circuit which receives the wheel speed signals and generates brake pressure control signals, and a brake pressure control valve responsive to the brake pressure control signals for controlling the brake pressure applied to the wheels.

In anti-locking brake systems in which brake pressure is built up in pulses so as to achieve a flat average rate of pressure increase, it is known to make the initial brake-pressure pulse after an instability greater than the pulses that follow. This can be seen in FIG. 1.

In FIG. 1, the duration T0 of the pressure rise time is dependent on the number of such pulses or on the pressure build-up time which was necessary in the preceding control cycle to cause the wheel to become unstable. The holding time $T_H$ either has a fixedly pre-established length, or else it is the time considered to be optimum, and this time $T_H$ is determined through a learning process.

SUMMARY OF THE INVENTION

It is an object of the invention to further optimize brake control.

This object, as well as further objects of the present invention which will become apparent from the description that follows are achieved, according to the present invention, by providing a brake pressure control unit which operates in such a manner that, after brake pressure decays, the brake pressure is at first increased in a timed build-up with reference to the brake pressure build-up in a preceding control cycle, and thereafter the brake pressure is further increased by a sequence of pulses until an instability is again detected. This timed pressure build-up thus has at least two timed brake pressure build-up phases which have respective durations such that the duration of each one of the timed build-up phases in a given time pressure build-up is longer than the length of the subsequent timed build-up phase in the control cycle, if any. In addition, the duration of the timed build-up is a function of the preceding pressure decay time, this function being such as to reduce the value of longer decay times relative to shorter decay times.

For a full understanding of the present invention, reference should now be made to the following detailed description of the preferred embodiments of the invention and to the accompanying drawing.

BRIEF DESCRIPTION OF THE DRAWINGS

FIG. 1 is an example of controlled brake pressure versus time in an anti-locking brake control system of the prior art.

FIG. 2 is a diagram of one example of controlled brake pressure verses time in the anti-locking brake control system according to the principles of the present invention.

DESCRIPTION OF THE PREFERRED EMBODIMENTS

For this purpose the pressure rise time T0 preceding the set series of pulses is preferably broken down into two pulse rise times T01 and T02, wherein T01 is decidedly longer than T02.

Since T01 and T02 can produce a pressure increase of the desired amount only if it is known whether the pressure level at the beginning of the time period T01 is definitely different from the pressure level in the preceding pressure regulating cycle, allowance is also made for the pressure decay time in determining T01 and T02. Thus, if $T_{An}$ is the pressure decay time in the nth cycle and T01$n$ and T02$n$ are the two pressure rise times in the nth cycle, the following rule is to apply: if $T_A2$ is greater than $T_A1$, then T012 is made greater than T011 and T022 is made greater than T021, and if $T_A3$ is much less than $T_A2$, then T013 is made much less than T012 and T023 is made much less than T022.

The effect of the control measures taken in accordance with the present invention is seen in the second regulating cycle in FIG. 2.

Figure 3:
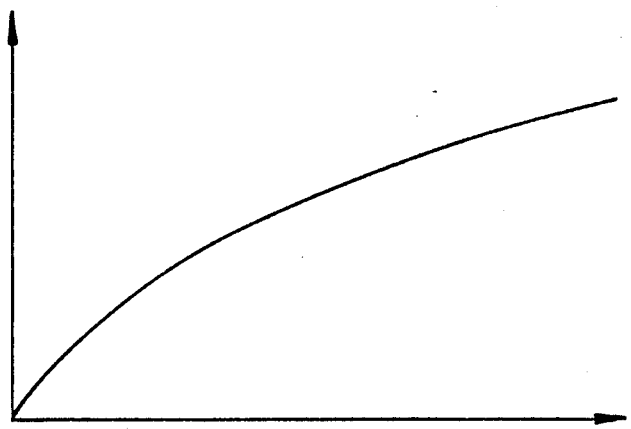
FIG. 3 is a diagram of brake pressure verses the period during which the brake pressure relief valve is open.

Since a linear relationship between brake pressure decay and the duration of the relief valve's period of actuation exists only at higher brake pressures, the measured pressure decay time must be converted before it is used to establish the values of T01 and T02. This relationship is reflected in FIG. 3.

By this method the pulses in periods T01 and T02 can be determined on uniform road surfaces so exactly that, after T02, the lock-up pressure is nearly regained and, thus, the average pressure gradient for the further pressure increases can be very flat. This method permits a correct determination of T01 and T02, in the event of brief fluctuations in the amount of friction. For example, in the event of a momentary decrease in friction such as an icy patch the pressure relief valve is actuated for a comparatively long time then the duration of rise times T01 and T02 is definitely increased in the next pressure rise when friction is high again.

Figure 4:
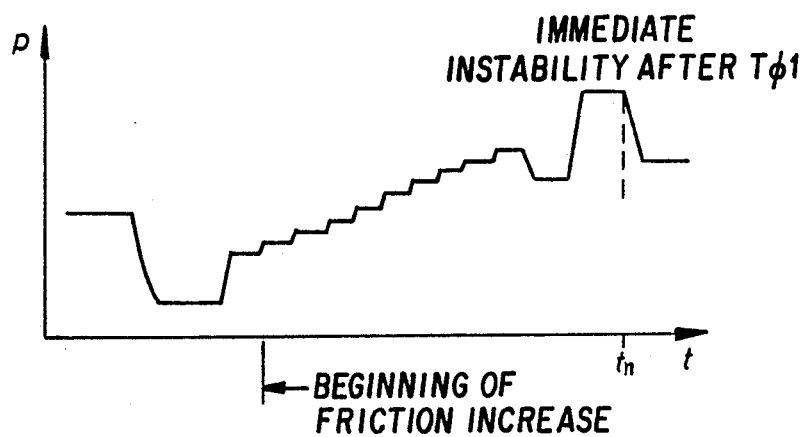
FIG. 4 is a diagram of brake pressure verses time in an anti-locking brake control system according to the present invention.

In the case of an increase in friction, the pulse series runs for a very long time until instability occurs again as shown in FIG. 4. This establishes high values for T01 and T02. As a result, the wheel is immediately overbraked, as occurs at $t_n$ in FIG. 4.

This is prevented if T01 and T02 are made no longer than the sum of the pressure decay periods during the last instability.

A pressure build-up after T02 can be provided by a sequence of pulses in which the holding phase depends on vehicle retardation, rather than having a constant $\Delta t$ for the holding phases. In this variant, whenever a given $\Delta v$ is reached a given pressure rise takes place and the length of the pressure holding phase is dependent upon the retardation of the vehicle. In the case of slight vehicle retardation, the holding phases are long, stable phases having a low $\mu$ (gradient), and in the case of great retardation, they are short.

Increases in friction are more quickly recognized and the average rate of the pressure rise is more rapidly increased in this variant. Using the measured or computed vehicle retardation achieves a similar effect: When there is little retardation, high $\Delta t$'s are established for the holding phases, and low $\Delta t$'s when there is great retardation.

Breaking down T0 into T01 and T02 in accordance with the present invention has the advantage that the slowing of the wheel's circumferential speed corresponding to each pressure ;ulse does not become excessive. If the pressure built up over the time T0 is too great, the circumferential retardations of the wheel produced may momentarily erroneously indicate an instability. By dividing T0 into T01 and T02, these two pressure rise times can come closer to the wheel lock-up pressure without producing unacceptably great retardation rates. This is especially true when the rise times T01 and T02 alternate with short pressure holding periods.

Further, by allowing for the pressure decay time, the pulse periods T01 and T02 are correctly established when friction varies.

Additionally, excessively fast overbraking at the start of the pulse series after an increase in friction is prevented by the rule that T01 and T02 may not become longer than the preceding pressure decay period.

Lastly, if the stable, low-$\mu$ (gradient) pressure holding periods are dependent upon the vehicle's velocity decrease $\Delta v$ or on vehicle retardation, then friction increases will be more quickly detected.

Figure 5:
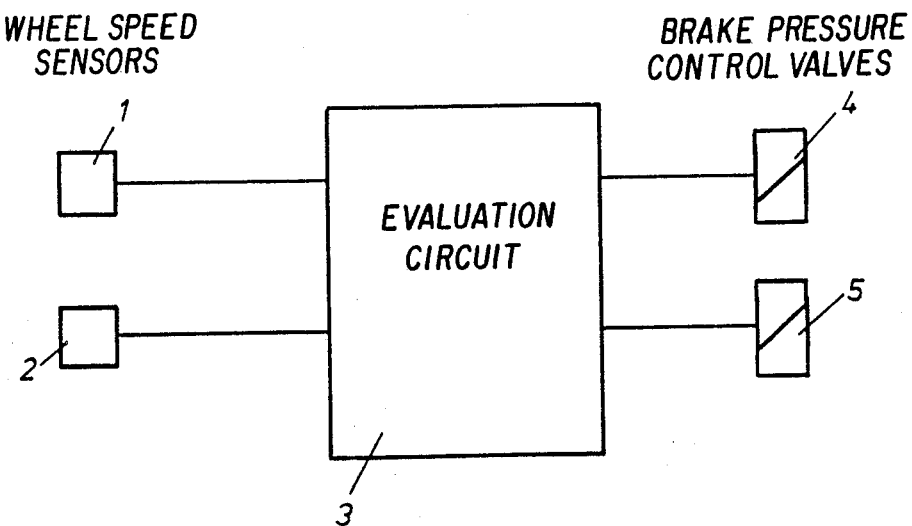
FIG. 5 is a block diagram of the basic elements of an anti-locking brake control system, which include wheel sensors, an evaluation (processing) circuit and brake pressure control valves.

The features of the invention discussed above will be further explained with the aid of the embodiment shown in the drawings. FIG. 5 is a the block diagram of an anti-locking brake control system. Two pickups associated with different wheels for measuring wheel velocity are marked 1 and 2, and the evaluation (processing) circuit is marked 3. The processing circuit 3 derives brake pressure control signals from the wheel velocity signals provided by the pickups, 1, 2. The pressure control signals are fed to the solenoid valves 4 and 5, particularly valve combinations consisting of one inlet and one outlet valve each, and, thereby, vary the brake pressure on the corresponding wheels.

Figure 6:
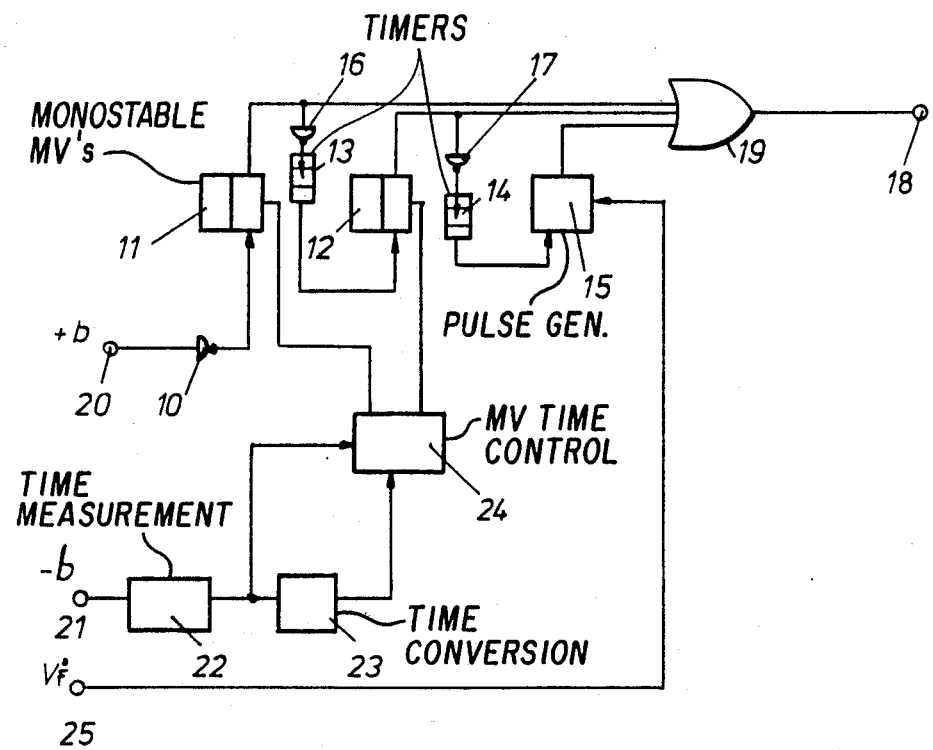
FIG. 6 is a block diagram of one possible circuit, according to the present invention, which may be employed in the processing circuit of FIG. 5.

To achieve a pressure rise in accordance with the invention, the processing circuit of FIG. 5 may contain the circuit shown in FIG. 6. To produce the pressure pulses for a wheel, inverters 10, 16 and 17, two monostable multivibrators 11 and 12, two timers 13 and 14, a pulse generator 15 and an OR gate 19 are provided.

The trailing edge of a signal such as the $+b$ signal provided through the inverter 10 from terminal 20 for keeping the pressure constant sets the monostable multivibrator 11 whose time constant determines the length of the first pressure pulse. This pulse T01 passes through the OR gate 19 to the terminal 18 connected to the inlet valve, opening the inlet valve so that braking pressure rises during the period T01.

The trailing edge of this first pressure pulse sets the timing circuit 13 through the inverter 16. The timing circuit 13, after the end of its time-delay, sets the monostable circuit 12. The timing circuit 13 thus determines the pressure-holding period up to the beginning of the second pressure pulse T02. The length of second pulse T02 is determined by the time constant of the monostable multivibrator 12; it is substantially shorter than the time constant of monostable multivibrator 11. Through the inverter 17, the trailing edge of the second pulse sets the timing circuit 14 which determines the subsequent pressure holding period. At the end of the holding period the pulse generator 15 is turned on, which produces the subsequent pressure build-up pulses.

The times T01 and T02 can be varied. In accordance with one embodiment the time constants of the monostable multivibrators 11 and 12 are modified simply by determining the duration of the "$-b$" pressure delay signal present at terminal 21 in block 22, converting the measured duration in accordance with the curve of FIG. 3 in block 23 and providing it to the monostable multivibrators 11 and 12 for changing their time constants through block 24. However, block 24 may be constrained to prevent the sum of the two pressure rise times T01 and T02 from becoming longer than the preceding pressure decay time $T_A$. For this purpose the pressure decay time $T_A$ determined in block 22 is also fed directly to block 24.

As mentioned in the beginning, the duty cycle of the signal produced by the pulse generator can be dependent on the vehicle retardation. The vehicle retardation signal $V_F$ delivered to terminal 25 is fed to the pulse generator 15 for this purpose.

Figure 7:
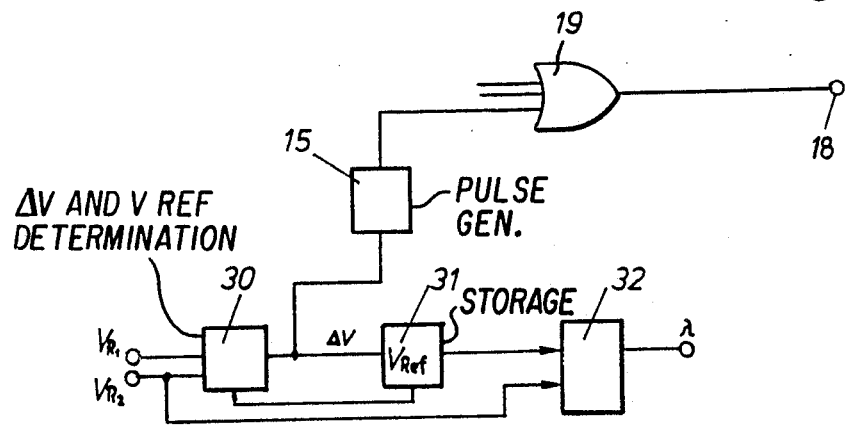
FIG. 7 is a block diagram of another possible circuit, according to the present invention, which may be employed in the processing circuit of FIG. 5.

FIG. 7 shows additional possibilities for influencing the duty cycle of the signal produced by the pulse generator 15. In FIG. 7 the maximum velocity is determined in block 30 from the wheel velocities $V_{R1}$ and $V_{R2}$. A reference velocity $V_{Ref}$ is continuously determined, using the maximum $V_R$ and given rates of deceleration. If a given difference $\Delta v$ between the just-determined reference velocity and the reference velocity previously determined and stored in a store 31 is reached, the new reference velocity is fed to the store for correction. The reference velocity is used in a block 32 to form slippage signals $\lambda$.

The difference $\Delta v$ between the present $V_{Ref}$ value and a previously determined reference velocity $V_{Ref}$ that is stored in memory is provided to the pulse generator 15. Each time a velocity difference $\Delta v$ is reached, a pulse is produced by the pulse generator. The lengths of the pressure holding periods are thus related to the retardation of the vehicle. The production of the pulses by the $\Delta v$ signals will, of course, only be effective if the pulse generator 15 is actuated after the measured pulses T01 and T02.

There has thus been shown and described a novel anti-locking brake control system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

I claim:

1. An anti-lock brake control system comprising:
   a pickup responsive to wheel movement to produce a signal;
   means for detecting instability of a wheel from said pickup signal;

means for producing a brake pressure control signal; and a brake pressure control means, responsive to said brake pressure control signal for varying the brake pressure, such that after brake pressure decays the brake pressure is first increased in a timed build-up with reference to the brake pressure built up in a preceding control cycle and then the brake pressure is further increased by a sequence of pulses until an instability is again detected, said timed pressure build-up having at least two timed brake pressure build-up phases and said timed build-up phases having respective durations such that the duration of each of said timed build-up phases in a given timed pressure build-up is longer than the length of the subsequent timed pressure build-up phase in said timed pressure build up, if any, the duration of said timed build-up being a function of the preceding pressure decay time, said function reducing the value of longer decay times relative to shorter decay times in the determination of said timed pressure build-up.

2. The anti-lock brake control system according to claim 1 wherein the pressure build-up produced by the sequence of pulses takes place with very slight gradients.

3. The anti-lock brake control system according to claim 1 wherein the sum of durations of the phases in a given timed pressure build-up is greater than the duration of the preceding pressure decay time.

4. The anti-lock brake control system according to claim 1, wherein each pulse in said sequence of pulses has a holding phase and the duration of said holding phase is a function of the decrease in the vehicle's velocity.

5. The anti-lock brake control system according to claim 4, characterized in that after a given velocity decrease $\Delta v$ a pressure build-up takes place.

6. The anti-lock brake control system according to claim 1, wherein each pulse in said sequence of pulses has a holding phase and the duration of said holding phase is a function of the vehicle's deceleration.

* * * * *